United States Patent
Johann et al.

(10) Patent No.: US 12,116,293 B2
(45) Date of Patent: Oct. 15, 2024

(54) DEVICE AND METHOD FOR PURIFYING DRINKING WATER

(71) Applicant: BWT Holding GmbH, Mondsee (AT)

(72) Inventors: Jürgen Johann, Nußloch (DE); Mark Fink, Lörrach (DE); Mathias Schwaiger, Lochen am See (AT); Werner Kues, Köstendorf (AT); Lorenz Haschka, Sankt Gilgen (AT)

(73) Assignee: BWT Holding GmbH, Mondsee (AT)

( * ) Notice: Subject to any disclaimer, the term of this patent is extended or adjusted under 35 U.S.C. 154(b) by 371 days.

(21) Appl. No.: 17/042,252

(22) PCT Filed: Mar. 29, 2019

(86) PCT No.: PCT/EP2019/058079
§ 371 (c)(1),
(2) Date: Sep. 28, 2020

(87) PCT Pub. No.: WO2019/185908
PCT Pub. Date: Oct. 3, 2019

(65) Prior Publication Data
US 2021/0047207 A1 Feb. 18, 2021

(30) Foreign Application Priority Data
Mar. 29, 2018 (DE) .................... 10 2018 107 596.0

(51) Int. Cl.
*C02F 1/44* (2023.01)
*B01D 61/02* (2006.01)
(Continued)

(52) U.S. Cl.
CPC ............ *C02F 1/441* (2013.01); *B01D 61/025* (2013.01); *B01D 61/081* (2022.08); *B01D 61/10* (2013.01);
(Continued)

(58) Field of Classification Search
CPC ...... B01D 61/025; B01D 61/08; B01D 61/10; B01D 65/02; B01D 65/08; B01D 2311/06;
(Continued)

(56) References Cited

U.S. PATENT DOCUMENTS 5,256,279 A    10/1993   Voznick et al.
5,352,364 A *   10/1994   Kruger .................... A61M 1/28
                                                                              210/259

(Continued)

FOREIGN PATENT DOCUMENTS

DE           4340318 C1     4/1995
DE     102008006501       5/2013
(Continued)

OTHER PUBLICATIONS

EP0567751A1—EPO Machine Translation (Year: 2021).*
(Continued)

*Primary Examiner* — Patrick Orme
(74) *Attorney, Agent, or Firm* — Smartpat PLC (57) ABSTRACT

In order to improve the lifespan of the semi-permeable membrane or the yield of the reverse osmosis system in the treatment of drinking water by means of reverse osmosis, the invention provides a device for treating drinking water with at least one reverse osmosis vessel which is divided into at least two chambers by at least one semi-permeable membrane, wherein a first chamber has an inlet for the water to be treated and an outlet for the concentrate, and the second chamber has an outlet for the treated water, wherein the device comprises at least one pressure vessel which is connected to the outlet for the treated water via a line, wherein the device is designed in such a way that, in an idle state, treated water flows out of the pressure vessel, through the semi-permeable membrane and into the first chamber.

6 Claims, 6 Drawing Sheets

(51) Int. Cl.
    *B01D 61/08*     (2006.01)
    *B01D 61/10*     (2006.01)
    *B01D 65/02*     (2006.01)
    *B01D 65/08*     (2006.01)
    *C02F 1/50*     (2023.01)

(52) U.S. Cl.
CPC ............ *B01D 65/02* (2013.01); *B01D 65/08* (2013.01); *C02F 1/50* (2013.01); *B01D 2311/06* (2013.01); *B01D 2311/12* (2013.01); *B01D 2311/2626* (2013.01); *B01D 2311/2692* (2013.01); *B01D 2313/18* (2013.01); *B01D 2313/24* (2013.01); *B01D 2321/04* (2013.01); *B01D 2321/12* (2013.01); *C02F 2201/005* (2013.01); *C02F 2201/006* (2013.01); *C02F 2303/04* (2013.01); *C02F 2303/16* (2013.01); *C02F 2303/185* (2013.01); *C02F 2303/22* (2013.01); *C02F 2307/06* (2013.01); *C02F 2307/10* (2013.01)

(58) Field of Classification Search
CPC ............ B01D 2311/12; B01D 2311/14; B01D 2311/2626; B01D 2311/2692; B01D 2313/18; B01D 2313/24; B01D 2321/04; B01D 2321/12; C02F 1/283; C02F 1/441; C02F 1/50; C02F 1/76; C02F 2201/005; C02F 2201/006; C02F 2209/03; C02F 2303/04; C02F 2303/16; C02F 2303/185; C02F 2303/20; C02F 2303/22; C02F 2307/06; C02F 2307/10
See application file for complete search history.

(56) References Cited

U.S. PATENT DOCUMENTS

| | | | |
|---|---|---|---|
| 5,690,829 | A | 11/1997 | Lauer |
| 6,290,856 | B1 | 9/2001 | Beall |
| 8,518,225 | B2 * | 8/2013 | Sumita .................. C02F 1/4676 |
| | | | 204/263 |
| 2005/0205478 | A1 | 9/2005 | Kung et al. |
| 2007/0256977 | A1 * | 11/2007 | Schmitt .................. B01D 61/12 |
| | | | 210/652 |
| 2011/0180464 | A1 | 7/2011 | Schmitt |
| 2013/0075310 | A1 | 3/2013 | Völker |
| 2017/0106339 | A1 | 4/2017 | Smirnov et al. |

FOREIGN PATENT DOCUMENTS

| | | | |
|---|---|---|---|
| DE | 202016100262 | U1 | 12/2016 |
| DE | 102016101000 | A1 | 7/2017 |
| EP | 0567751 | A1 * | 11/1993 ............. B01D 61/08 |
| EP | 2992945 | A1 | 3/2016 |
| RU | 2119377 | C1 | 9/1998 |
| RU | 2536993 | C2 | 12/2014 |

OTHER PUBLICATIONS

Boston University—Fluid dynamics and Bernoulli's equation, [online] [retrieved Jan. 13, 2023 from http://physics.bu.edu/~duffy/py105/Bernoulli.html] (Year: 2023).*

* cited by examiner

DEVICE AND METHOD FOR PURIFYING DRINKING WATER

TECHNICAL FIELD

The disclosure relates to a device and a method for purifying drinking water.

BACKGROUND

In the context of water purification processes, it has been known to purify drinking water using reverse osmosis (RO). For this purpose, reverse osmosis systems are used which comprise a semipermeable membrane that is arranged in a container so as to separate it into two chambers. The semipermeable membrane is impermeable to one or more substances dissolved in the water. The semipermeable membrane allows to reduce the concentration of these substances in the water by feeding raw water ("feed") into the container and pressing it against the membrane under pressure.

Thereby, water molecules pass through the membrane and leave the first chamber, while the respective dissolved substances are held back by the membrane and accumulate in the first chamber. The water molecules passing through the membrane emerge in the second chamber of the container and form the main component of the water extracted from the reverse osmosis system, also known as "permeate". The substances retained by the semi-permeable membrane will enrich in what is known as "concentrate" or "wastewater".

Reverse osmosis systems are usually operated until the membrane becomes so poorly efficient, due to dirt and encrustations, that further operation is no longer worthwhile, and the membrane has to be replaced or cleaned.

Another drawback of reverse osmosis systems that are used in discontinuous operation is that during the standby state a liquid, usually water, is standing on the feed or concentrate side of the RO membrane, which has a concentration of ions of dissolved salts or organic constituents in an amount corresponding to the mean value of the concentrations of feed and concentrate. The concentration of the ions can be determined based on the conductivity of the water.

The following example illustrates this problem. Here, "yield" of the reverse osmosis refers to the ratio between the amount of virtually salt-free permeate and the amount of feed. The higher this value, the less concentrate is resulting.

Case 1: With a conductivity of the feed of 500 µS/cm (microsiemens per centimeter) and a yield of the reverse osmosis of 50%, the conductivity of the concentrate is approx. 1000 µS/cm. The mean concentration resulting therefrom on the concentrate side of the membrane is 750 µS/cm.

Case 2: With a conductivity of the feed of 500 µS/cm (microsiemens per centimeter) and a yield of the reverse osmosis of 75%, the conductivity of the concentrate is approx. 2000 µS/cm. The mean concentration resulting therefrom on the concentrate side of the membrane is 1250 µS/cm.

This means that a concentration gradient between concentrate and permeate is established, which is generally greater than 20 µS/cm. As a result, the salts, heavy metals, and other contaminants, of which at least 98% are retained during operation, will still diffuse to the permeate side during standby. Diffusion will only stop when the concentration is equalized. Thus, the permeate will therefore be contaminated after just a few minutes during standby.

This is because each membrane has a particular salt retention rate, which is given as 98% here, some manufacturers specify a salt retention rate of 95%. A small proportion of the salts, i.e. 2% or 5% will therefore still reach the permeate side, since in reality no membrane completely retains all substances. During the standby state, this material transport is driven by diffusion, as the particles move from regions with high concentration (i.e. from the concentrate side of the membrane) to regions with low concentration (i.e. the permeate side of the membrane).

Diffusion is the equalization of concentration differentials occurring without external influence as a natural physical process due to Brownian molecular movement. In the case of an uneven distribution, statistically more particles move from regions of higher to regions of low concentration or particle density than vice versa. Diffusion also causes an exchange of substances through a semipermeable membrane, in which case dissolved molecules will migrate from highly concentrated into weakly concentrated solutions. This leads to a considerable increase in the concentration of substances in the permeate within a relatively short time, which is undesirable.

In the case of under-counter reverse osmosis at the point of use, stagnation times, i.e. the duration of the "standby" state, may be very long, since only a few liters of water are withdrawn per day, i.e. little water is extracted. In this case, the quality of the permeate is usually very poor at the beginning of the extraction.

Therefore, the permeate may be flushed from time to time. However, the problem herewith is that the flushing conduit is connected to the wastewater conduit and bacteria may thus get into the permeate.

SUMMARY

Given the above, the disclosure is based on the object of at least mitigating the drawbacks of the prior art mentioned.

More particularly, it is an object to provide a method and a device for purifying drinking water by reverse osmosis, which improve both service life of the semipermeable membrane and yield of the reverse osmosis system.

A further object is in particular to provide a method and a device for purifying drinking water through reverse osmosis, in which re-salinization of the permeate during discontinuous operation is reduced and in particular substantially prevented.

The object is achieved with a method for purifying drinking water which, in an extraction operation mode, comprises conveying drinking water to be purified through a semipermeable membrane in reverse osmosis operation and separating it into permeate and concentrate; and which, during an idle operation state, comprises passing part of the permeate through the membrane due to an overpressure and thereby displacing the concentrate on the concentrate side of the membrane and removing any deposits that may be present on the concentrate side of the membrane.

The object is furthermore achieved by a device for purifying drinking water, which comprises at least one reverse osmosis container which is divided into at least two chambers by at least one semi-permeable membrane, a first chamber having an inlet for the water to be purified and an outlet for the concentrate, and a second chamber having an outlet for the purified water, and wherein the device comprises at least one pressure vessel which is in liquid communication with the purified water outlet of the reverse osmosis container and the device is configured such that in an idle operation state purified water flows from the pressure vessel through the semipermeable membrane and into the first chamber.

Only pure permeate is used for backflushing the membrane. No other fluid is introduced into the permeate conduit, in particular no gas such as compressed air or the like, in order to press permeate from the second chamber through the membrane and into the first chamber, counter to the extraction state flow direction. The disclosure thus provides for a particularly simple and hygienic configuration of the device for purifying drinking water.

The backflushing according to the disclosure counteracts the undesired diffusion from the concentrate side to the permeate side of the membrane described above. The permeate displaces the concentrate on the concentrate side of the semipermeable membrane. Therefore, conductivity is preferably less than 100 µS/cm (microsiemens per centimeter) on both sides of the membrane, and no concentration increase will occur on the permeate side during the standby state. The larger the pressure tank, the more concentrate can be displaced and the lower the conductivity will be following the idle operation state or a stagnation phase.

So, the permeate flows into a pressure tank during an extraction stop, thereby accumulating a permeate supply and pressurizing the pressure tank, and during the idle state, as a result of this pressure, at least part of the permeate accumulated in the pressure tank passes through the membrane due to the overpressure and thereby displaces the concentrate on the concentrate side of the membrane and removes any deposits that may be present on the concentrate side of the membrane.

The designation of "first" and "second" chambers was merely chosen to distinguish the components here.

For adjusting the ratio between concentrate flow and permeate flow, a restricting means may in particular be used in the concentrate conduit. The restricting means may be provided in a simple form of a baffle, or a throttle valve, a throttle flap, or a capillary or, for example, what is known as a "flow restrictor" achieving restriction using a Venturi nozzle. In principle, any means which limits the flow of concentrate can be used to adjust the ratio between concentrate flow and permeate flow. Even a pressure tank in the concentrate conduit could be used, since the increased counter pressure also restricts the flow. It is also possible to measure the conductivity of the permeate and to control the ratio of permeate flow to concentrate flow using a control valve, for example.

In order to provide for a longer service life of the membrane and/or a better efficiency of the system, a pressure tank is installed on the permeate side. This pressure tank can be used to backflush the RO membrane. The permeate conduit that is connected to the outlet of the second chamber of the reverse osmosis container is not in communication with the wastewater conduit. During the backflushing, the water on the concentrate side, i.e. in the first chamber of the reverse osmosis container, is displaced by permeate which is conveyed through the membrane and into the concentrate at low pressure. After backflushing, the water available on the concentrate side in particular has a permeate quality of less than 100 µS/cm. The concentration gradient across the semipermeable membrane between the contents of the first chamber and the contents of the second chamber is virtually zero.

Thus, the disclosure provides for a very good water quality every time water is withdrawn from the device, regardless of the stagnation time.

Furthermore, the permeate backflushing repeatedly detaches or removes from the semipermeable membrane what is known as "scaling", i.e. deposits formed by poorly soluble substances such as $CaCO_3$, $SiO_2$, $CaSO_4$ etc., and/or what is known as "fouling", i.e. contamination of the membrane, in particular by microorganisms ("biofouling"). This allows to durably operate the reverse osmosis with a yield of more than 75%.

The disclosure primarily relates to so-called under-counter reverse osmosis systems for domestic drinking water. In addition, a further pressure tank can be connected to such a system for the case that the reverse osmosis is not powerful enough to reliably deliver a sufficient amount of water when the water faucet associated with the device is opened. This additional pressure tank is arranged on the permeate side in the case of under-counter reverse osmosis systems and is intended to ensure that a sufficiently large amount of permeate can be withdrawn at any time. On the membrane side thereof, a check valve is installed in order to prevent the membrane from being damaged by the high pressure of the tank (>2 bar).

Thus, the function of this additional pressure tank is conveyance in exactly the opposite direction to the pressure tank of the disclosure which is used to convey permeate back through the reverse osmosis system.

This pressure tank may therefore also be a tank in which a pressurized gas reservoir, for example an air reservoir, is compressed, for example through a diaphragm or a piston, so as to keep the water under a minimally required pressure.

In conventional reverse osmosis systems, a backflow preventer ensures that the pressure tank in the permeate conduit does not empty in the wrong direction. This would also damage the membrane used for reverse osmosis.

In contrast to such a prevention of backflow, the disclosure involves operating the reverse osmosis in counter direction, from the pressure tank through the second chamber of the reverse osmosis container so that concentrate is displaced from the first chamber, in order to clean the semipermeable membrane and to displace concentrate. For this purpose, the pressure tank is provided on the permeate side. Alternatively, a pump may be used for example, as will be described in more detail below. If an additional pressure tank is required to maintain a sufficiently high output of permeate, such tank should be arranged downstream of the backflush tank and should be protected by a backflow preventer on the RO side.

While in conventional reverse osmosis systems the concentrate side is flushed with water, the present disclosure suggests to apply a pressure on the permeate side in the backflushing mode so that the water flows through the membrane in the counter direction. This removes dirt and encrustations, but also high concentrations of ions on the membrane or in the vicinity thereof. This significantly increases the service life of the membrane.

As a result of the counter flow through the semipermeable membrane, the water on the concentrate side is also displaced and brought to a similarly low conductivity as on the opposite side. This means that water with a low conductivity will be present on the permeate side from the beginning.

Preferred embodiments and refinements will be apparent from the subject matter of the dependent claims, the description, and the drawings.

In an advantageous embodiment, the pressure tank has a holding capacity in a range between about 0.1 l and 5 l, preferably the volume of the pressure tank is about 1 l. This makes it possible to build the device with dimensions that allow operation in the form of an under-counter installation in common households, in particular in kitchens or bathrooms.

According to a further advantageous embodiment, the device is designed for operation without electric power. This means that only water-carrying conduits are installed, and the operation is solely hydraulic. For this purpose, the disclosure contemplates that the pressure vessel comprises an elastic material. The elastic material is in particular dimensioned and arranged so as to expand in an extraction operation state of the device, so that a restoring force is created in the elastic material, which causes the material to relax in the standby operation state of the device, whereby purified water flows back from the pressure vessel through the semipermeable membrane and into the first chamber.

In a first variant, this is implemented by the pressure vessel comprising an elastic diaphragm. For this purpose, a pressure vessel with a rubber diaphragm is preferably used, that means the device is operated without electric power. In this case, the backflushing from the pressure vessel is caused by the pressure built up in the pressure vessel during water withdrawal and thus during filling of the pressure vessel with permeate, which pressure is therefore in particular higher than the pressure in the second chamber and also in the first chamber of the reverse osmosis container.

According to a further embodiment it is contemplated that the pressure vessel is provided in the form of a flexible tube made of elastic material, in particular a silicone tube.

If according to this embodiment an elastic material such as a silicone tube is used as a "pressure and permeate accumulator" instead of a conventional pressure tank, this silicone tube will expand when being filled or when experiencing a restricted flow therethrough, and will re-contract when the conduit pressure decreases. This will again press the permeate through the semipermeable membrane, for backflushing.

The following advantages were found when using a silicone tube for backflushing or flushing a semipermeable membrane in a reverse osmosis device:
(1) A silicone tube is more hygienic in operation than a small pressure tank, because silicone is used instead of EPDM and since the contact surface is smaller, the permeate volume in the silicone tube is completely exchanged, depending on the installation.
(2) Installation size is smaller.
(3) Manufacturing costs are lower compared to a pressure tank.
(4) The embodiment involves low maintenance, since no system pressure has to be adjusted or checked. "Plug & play" installation is possible.
(5) Depending on the installation situation, there is no or very little standing water in the silicone tube.
(6) Existing systems can be retrofitted more easily.
(7) Such "pressure tanks" comprising a silicone tube can be extended as desired. Modular design is made possible.
(8) A silicone tube may also be used as a permeate storage tank downstream of the reverse osmosis system.

In particular as an alternative implementation, the disclosure provides a further embodiment in which the device comprises a reservoir connected to a pump as the pressure vessel. The pump is switched on in response to the shutoff of the reverse osmosis and pressurizes the contents of the reservoir so that the membrane is flushed with permeate from the reservoir. The device can therefore also be operated with electric power.

The automatic backflushing on the one hand ensures that dirt and encrustations on the concentrate side of the semipermeable membrane of the reverse osmosis container are removed and conveyed into the wastewater through the concentrate conduit. On the other hand, the backflushing of the RO membrane also displaces the water remaining on the concentrate side by permeate. Both processes are caused by an overpressure on the permeate side. To generate this overpressure, there are different options such as the two described above, which will be selected by a person skilled in the art and which can also be used cumulatively on the basis of the given framework conditions such as desired withdrawal quantities, quality of the raw water, and/or anticipated standby times. What is important for the realization of these advantages is that the device is not connected to a wastewater conduit on the permeate side.

To support the cleaning effect and for disinfection purposes, a disinfectant such as chlorine, for example in the form of chlorine gas $Cl_2$, may be admixed to the raw water.

For this purpose, according to a further embodiment, the device comprises a blending means for chlorine. The blending means is connected to a conduit for the water to be purified, in particular to the inlet of the first chamber of the reverse osmosis container for the water to be purified.

The blending means may provide chlorine gas from steel gas bottles or chlorine barrels, for example, and in this case the chlorine gas from the respective vessel is admixed to the raw water through an injector nozzle via at least one dosing control means. The pressure required for the injection is generated by a pressure booster pump which forms part of the blending means. The dosing control means controls the amount of chlorine gas required for the desired disinfection effect of the raw water that is used, which is predetermined by a person skilled in the art in advance.

However, the blending means may also be designed for other chlorination processes, for example for adding sodium hypochlorite or dissolved calcium hypochlorite to the raw water via a metering pump.

The chlorine can be removed again from the permeate on the permeate side. This embodiment is employed in countries in which chlorination of drinking water is prohibited. For this purpose, the disclosure contemplates that the device comprises an absorption means for a disinfectant, in particular for chlorine, which is connected to a permeate conduit, in particular to the purified water outlet of the second chamber of the reverse osmosis container. In particular, the absorption means is in the form of a carbon block or an activated carbon filter.

This moreover ensures that during the backflushing the semipermeable membrane is not subjected to the disinfectant, e.g. chlorine. In what is referred to as the stagnation phase, i.e. the duration of the standby state, no chlorine or other disinfectant will come into contact with the membrane, since the chlorine or other disinfectant was removed from the permeate by the absorption means and therefore the backflushing involves clean permeate. This also increases the service life of the membrane, since the membrane is only exposed to chlorine or another disinfectant when water is extracted.

In an advantageous embodiment, the reverse osmosis container is in the form of a filter candle. This provides for a very compact configuration of the device.

Such a filter candle is in particular configured such that the inlet and the outlets are integrated in a base unit that can be installed stationarily, and the reverse osmosis container is provided in the form of an exchangeable unit which is detachably connected to the base unit. Due to its simple structure in combination with the exchangeable reverse osmosis container, such a device for purifying drinking water through reverse osmosis lends itself particularly well for use in private households.

When, eventually, a membrane of the reverse osmosis container in the form of an exchangeable unit has been too heavily loaded by fouling and scaling processes, the reverse osmosis device can easily be exchanged. The exchange process is very simple due to the modularity of the device with a reverse osmosis container in the form of a filter candle. Prior to initial operation, the base unit is installed, for example it is permanently installed in a drinking water conduit. The base unit will not be affected by a later exchange of the reverse osmosis container. The exchange can be effected by a layperson without any problems.

In preferred embodiments, in order to allow the reverse osmosis container to be exchanged easily, the base unit which can be installed stationarily has a receptacle for the exchangeable unit, preferably a receptacle into which the exchangeable unit can be screwed. The receptacle preferably has an internal thread and the exchangeable unit has a mating external thread. Other technical options for releasably coupling the base unit and the exchangeable unit are also possible as a matter of course, for example a snap connection.

The filter candle used for the reverse osmosis container preferably has a coil structure. It preferably comprises a reverse osmosis membrane that is wrapped around a perforated tube that is used to collect and discharge the permeate (short: permeate collecting tube). In preferred embodiments of such reverse osmosis containers, a membrane pocket that is glued or fused together on both sides is connected to the permeate collecting tube at its open end and is wound around the tube. Spacer mats both within the membrane pocket and between the wound layers of the membrane pocket allow water to be introduced and discharged on the permeate side and on the concentrate side, respectively.

The membrane is particularly preferably provided in the form of a cylindrical coil which has two end faces, also referred to as the first and second end faces below. This coil is preferably arranged within the container in such a way that the first end face faces the head portion and the second end face faces the base.

The device for purifying drinking water as described above can advantageously be used in conjunction with an under-counter reverse osmosis system for drinking water in households which comprises such a device and a raw water conduit for supplying water to be purified, an extraction conduit for purified water, and a wastewater conduit for discharging concentrate.

This allows to obtain drinking water in a simple manner, for example by installing such an under-counter reverse osmosis system below the worktop of a kitchen, with the water inlet connection for the sink as a feed to the raw water conduit, and with extraction through the respective faucet. Especially if the reverse osmosis container of the device for purifying drinking water is in the form of a filter candle, the size of an under-counter reverse osmosis system can be significantly reduced compared to conventional systems, which is extremely favorable for installation below a common household sink.

In a preferred embodiment, the under-counter reverse osmosis system has a shut-off valve which couples the raw water conduit and the extraction conduit in such a way that when the valve is opened, water to be purified is supplied to reverse osmosis and at the same time purified water is extracted. This shut-off valve may be coupled to the faucet valve or may replace the latter.

The shut-off valve may also be configured so as to ensure, when the faucet valve is closed, that the device for purifying drinking water is filled with raw water and thus can build up a pressure. When the faucet valve is opened, water can be extracted immediately. Since according to one embodiment the shut-off valve interrupts the extraction but not the inflow of raw water, there is a continuous flow on the concentrate side, i.e. the first chamber of the reverse osmosis container.

The shut-off valve may in particular be designed such that after water has been extracted, i.e. once the faucet has been closed, it allows raw water to continue to flow through the concentrate side until pressure has been built up again on the permeate side, in particular until the pressure vessel has been re-pressurized. Only then does the shut-off valve close the raw water inflow to the concentrate side.

A shut-off valve for a reverse osmosis system is described in document US 2011/180464 A1, for example.

In a further embodiment it is also possible that a shut-off valve which couples the raw water conduit and the extraction conduit in such a way that when the valve is opened, water to be purified is supplied to reverse osmosis and at the same time purified water is extracted, is arranged upstream of the first chamber of the reverse osmosis container, i.e. on the concentrate side as seen in the flow direction, and that the device for purifying drinking water furthermore comprises a pressure monitoring means which is arranged downstream of the second chamber of the reverse osmosis container, i.e. on the permeate side as seen in the flow direction, and which is in communication with the shut-off valve. When the shut-off valve is closed, there is no pressure applied to the membrane of the reverse osmosis container from the first chamber on the concentrate side, since no water flows into the first chamber. Then, the pressure accumulator causes purified water to be conveyed from the permeate conduit into the second chamber and thus through the membrane. Therefore, even when the system is in standby, inlet water on the concentrate side will at least partially be displaced by permeate.

The disclosure furthermore provides a method for purifying drinking water, in particular using a device as described above, which method comprises, in an extraction operation state, conveying drinking water to be purified through a semi-permeable membrane in reverse osmosis operation and separating it into permeate and concentrate, and a first portion of the permeate is extracted as purified drinking water. A second portion of the permeate flows into a pressure tank during the extraction operation state, thereby accumulating and pressurizing a permeate supply in the pressure tank. In a standby operation state, the method comprises conveying permeate from the pressure tank through the semipermeable membrane in an osmosis mode, whereby backflushing is achieved.

The invention thus provides for very good water quality every time water is withdrawn from the device. Advantageously, this is irrespective of how long part of the water to be purified had already been standing in the reverse osmosis container before it was extracted. Moreover, the backflushing ensures that hardly soluble substances such as $CaCO_3$, $SiO_2$, $CaSO_4$ etc., which might accumulate on the semipermeable membrane as a deposit, are repeatedly removed therefrom.

In order to subject the semipermeable membrane to the lowest possible mechanical loads and thus provide for a long service life of the membrane, it is contemplated according to one embodiment of the method that the pressure differential applied across the semipermeable membrane for conveying the permeate through the semipermeable membrane is in a range between 0.05 bar and 1 bar, preferably in a range between 0.1 bar and 0.5 bar, most preferably between 0.2 bar and 0.4 bar.

According to a further advantageous embodiment, the method is conducted such that the conductivity of the water on the concentrate side of the semipermeable membrane has a value of less than 100 µS/cm during the idle state after backflushing. Furthermore, the method can be conducted such that the concentration gradient across the semipermeable membrane between the concentrate side and the permeate side is essentially zero during the idle state after backflushing.

Due to such a low concentration gradient between concentrate and permeate, less of the salts, heavy metals and other contaminants contained in the concentrate will accordingly be able to diffuse to the permeate side during the standby state. In this way, contamination of the permeate during standby is avoided.

BRIEF DESCRIPTION OF THE DRAWINGS

The invention will now be explained in more detail by way of exemplary embodiments and with reference to the accompanying drawings in which the same and equivalent components are designated by the same reference numerals, while features of the different exemplary embodiments may be combined with one another, and wherein.

DETAILED DESCRIPTION

Figure 1:
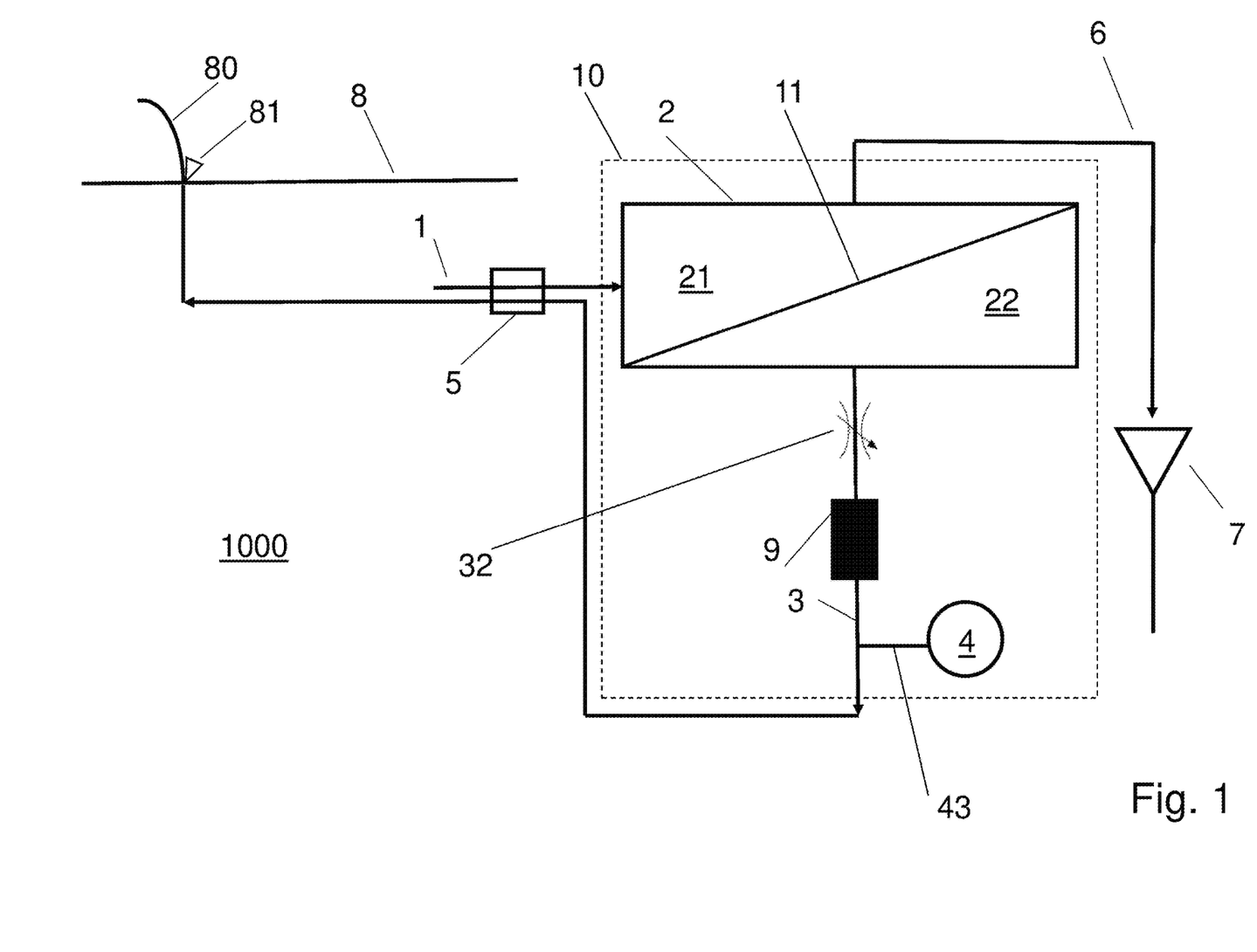
FIG. 1 is a schematic diagram of a device for purifying drinking water with a reverse osmosis container according to a first embodiment, which is installed below a kitchen worktop as part of an under-counter reverse osmosis system for drinking water.

FIG. 1 shows an under-counter reverse osmosis system 1000 for domestic drinking water arranged below a kitchen worktop 8. The under-counter reverse osmosis system 1000 comprises a device 10 for purifying drinking water comprising a reverse osmosis container 2 and a pressure tank 4.

The under-counter reverse osmosis system 1000 furthermore comprises a raw water conduit 1 and a conduit 3 for purified water. Inlet water is supplied to the device 10 through the raw water conduit. During operation, purified water can be withdrawn from the device 10 through extraction conduit 3.

Figure 5:
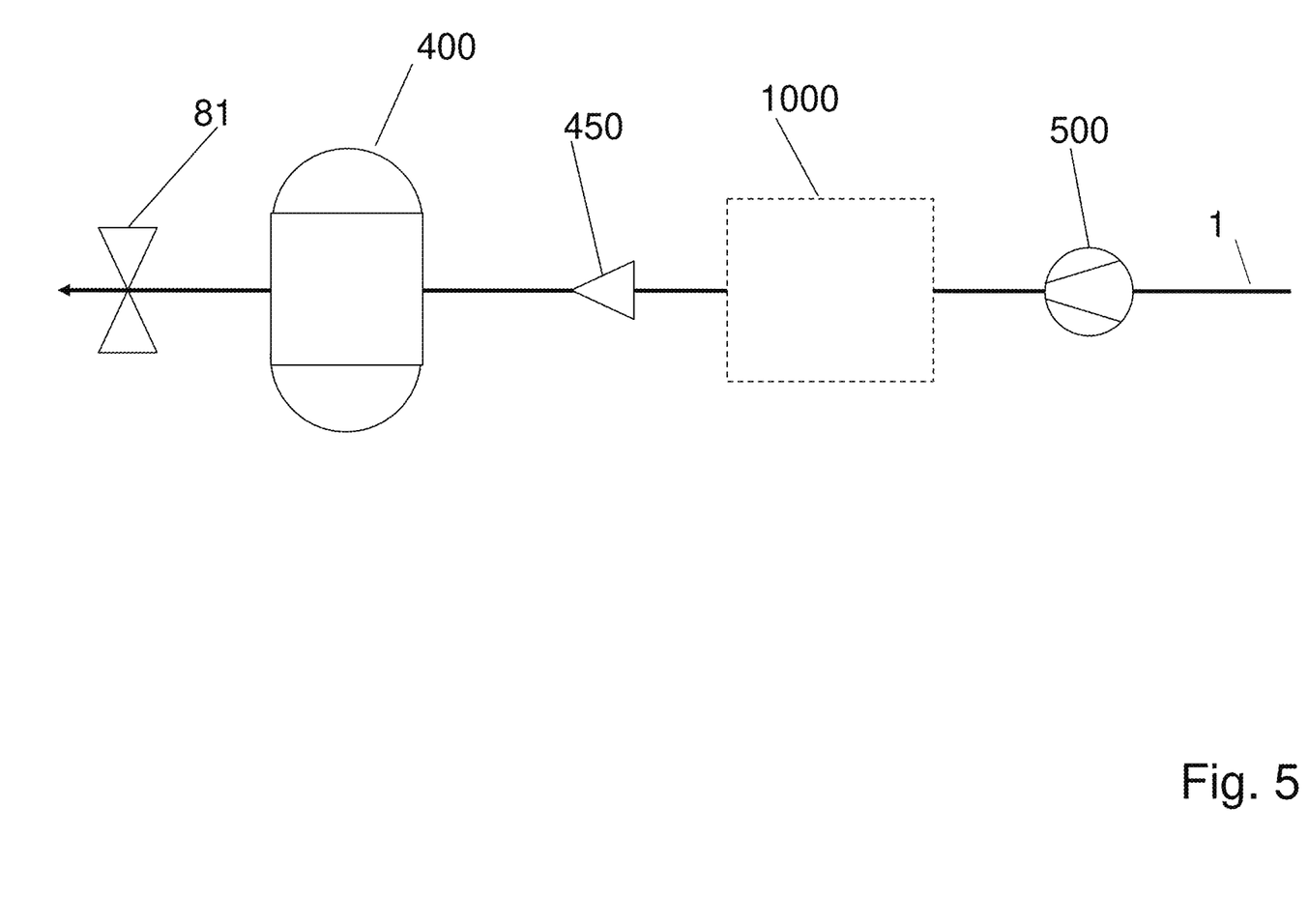
FIG. 5 is a schematic diagram of a device for purifying drinking water according to a fourth embodiment.

The under-counter reverse osmosis system may additionally have a further pressure accumulator. The latter may be arranged on the permeate side of the reverse osmosis container 2 and protected to this side by a backflow preventer. Such a further pressure tank will be subjected to the pressure that prevails in the conduit immediately upstream of this additional pressure tank and will be located upstream of the water faucet. FIG. 5 illustrates an embodiment of an under-counter reverse osmosis system 1000 in combination with such an additional pressure tank 400. When the water faucet is opened, the further pressure tank 400 ensures that permeate can always be withdrawn at a sufficient pressure via the water faucet.

The pressure tank 4, however, which is used for backflushing the semipermeable membrane of the reverse osmosis container 2 with permeate, is connected without a backflow preventer and applies pressures to the membrane during backflushing which are lower than the conduit pressure, in a range between about 0.05 bar and 1 bar.

In order to be able to provide a sufficient, preferably consistent pressure on the inlet side regardless of the installation situation, it is moreover possible to provide an electrically operated pump in the feed conduit, for example.

As furthermore illustrated in the diagram of FIG. 1, the reverse osmosis container 2 has a first chamber 21 and a second chamber 22. A semipermeable membrane 11 is arranged between chambers 21, 22.

When the device 10 and the under-counter reverse osmosis system 1000 are operated in the extraction mode, the input water supplied to the device 10 and thus to the reverse osmosis container 2, which has a conductivity of 500 µS, for example, is conveyed through the semipermeable membrane 11. During this process, substances dissolved in the inlet water are retained in the first chamber 21, so that a concentrate is produced. The concentrate which has a conductivity of 1000 µS, for example, can be discharged from the device 10 via concentrate conduit 6 and discarded via a wastewater conduit 7.

While the inlet water is conveyed through the semipermeable membrane 11, when the device 10 and the under-counter reverse osmosis system 1000 are operated in the extraction mode, the water entering the second chamber 22 will have a significantly reduced concentration of dissolved substances. This permeate is extracted as the purified water via a conduit 3.

When the valve 81 is closed, a pressure tank 4 connected to the permeate conduit 3 is filled with permeate via a conduit 43. After closing valve 81, the shut-off valve 5 remains open until the pressure tank 4 has been filled.

This is achieved purely hydraulically. The pressure tank 4 has a holding capacity in the range between approximately 0.1 l and 5 l, for example, and preferably the volume of the pressure tank is approximately 0.5 l to 1 l The table below gives measured values from the operation of a device for purifying drinking water comprising a pressure tank with a holding capacity of 750 ml.

| Date | Volume feed [liters] | Time | Conductivity | | | | Volume until peak is depleted | Volume for back-flushing |
|---|---|---|---|---|---|---|---|---|
| | | | Peak | Feed | Permeate flow/tank | Concentrate | | |
| Jan. 31, 2018 | 2077 | 2 min | 13.8 μS/cm | 340 μS/cm | 5.9 μS/cm | 546 μS/cm | 200 ml | 750 ml |
| Feb. 1, 2018 | 2238 | 5 min | 18 μS/cm | 340 μS/cm | 5.6 μS/cm | 559 μS/cm | 300 ml | 750 ml |
| Feb. 1, 2018 | 2285 | 10 min | 16.4 μS/cm | 340 μS/cm | 5.6 μS/cm | 554 μS/cm | 400 ml | 750 ml |
| Feb. 1, 2018 | 2312 | 30 min | 27.9 μS/cm | 340 μS/cm | 5.6 μS/cm | 554 μS/cm | 500 ml | 750 ml |
| Feb. 8, 2018 | 2979 | 60 min | 59 μS/cm | 344 μS/cm | 6.7 μS/cm | 568 μS/cm | 650 ml | 750 ml |
| Feb. 8, 2018 | 2986 | 2 hours | 84 μS/cm | 340 μS/cm | 6 μS/cm | 566 μS/cm | 650 ml | 750 ml |
| Feb. 12, 2018 | 3205 | 5 hours | 85 μS/cm | 348 μS/cm | 6 μS/cm | 571 μS/cm | 650 ml | 750 ml |
| Feb. 13, 2018 | 3225 | 1 day | 115 μS/cm | 348 μS/cm | 5.9 μS/cm | 571 μS/cm | 750 ml | 750 ml |
| Feb. 15, 2018 | 3123 | 2 days | 98.8 μS/cm | 347 μS/cm | 5.8 μS/cm | 562 μS/cm | 750 ml | 750 ml |

For the measurements given in the table above, a pressure tank with 750 ml permeate was used for backflushing. "Time" refers to the downtime before extraction started. In the table the time is given in minutes unless otherwise noted. "Peak" refers to the high concentration in the extracted permeate at the beginning of extraction at the extraction point, that is the conductivity of the extracted permeate immediately at the beginning of the extraction mode. The required "volume until peak is depleted" is always less than or equal to the volume of the pressure tank of 750 ml. In order to reliably remain below a conductivity of 100 μS/cm immediately at the beginning of the extraction ("peak") even after about one day of stagnation, the volume of the pressure tank may be increased, for example to 1 liter.

It is also possible to use a reservoir (not shown) which is connected to a pump (not shown) as the pressure vessel. In this case, too, purified water will be conveyed into the reservoir in the extraction mode, in particular hydraulically.

In the absence of extraction, the device 10 and thus the under-counter reverse osmosis system 1000 is in an idle state which is also known as a "standby state". With the loss of pressure applied to the water flowing into the chamber 21 and thus against the membrane 11 in the extraction state, with the entering into the idle state, a pressure will be built up to the membrane 11 from the side of the second chamber 22 by the permeate discharged out of the pressure tank 4 due to the pressure created in the pressure tank 4.

The emptying of the pressure tank 4 after entering the idle state and until the pressure differential as built up between the pressure tank 4 and the first chamber 21 during the extraction state has been equalized causes the automatic backflushing of the semipermeable membrane with the advantages and effects described above.

If a reservoir (not shown) connected to a pump (not shown) is used as the pressure vessel, the pump is connected so as to be enabled in response to the stop of extraction of the permeate and thus conveys purified water as accumulated in the reservoir into the second chamber 22 of the reverse osmosis container 2 and through the semipermeable membrane 11.

Since the backflushing from the second chamber 22 which holds the permeate after the extraction phase into the first chamber which holds the concentrate is an operation of the semipermeable membrane in the direction of osmosis instead of reverse osmosis, low pressure values are sufficient to enable backflushing, which pressure is provided by the pressure tank or the pump.

In particular if the device 10 is additionally equipped with a feeding or blending means for chlorine (not shown) for disinfection purposes in the case of contaminated raw water, it furthermore comprises an absorption device for removing the chlorine before the purified water is extracted. For this purpose, an activated carbon block 9 is provided in the illustrated exemplary embodiment.

The under-counter reverse osmosis system 1000 furthermore comprises a shut-off valve 5 which couples the raw water conduit 1 and the extraction conduit 3 in such a way that when the valve 5 is opened, water to be purified is supplied to reverse osmosis and at the same time purified water is extracted. The shut-off valve 5 may be coupled to the valve 81 of water faucet 80 or may replace it.

When the device 10 is in operation, the shut-off valve 5 has the effect that the device 10 for purifying drinking water is filled with raw water when the valve 81 of water faucet 80 is closed. Thus, when the valve 81 of faucet 80 is opened, water can immediately be withdrawn because water will already be available at the appropriate pressure.

Figure 2:
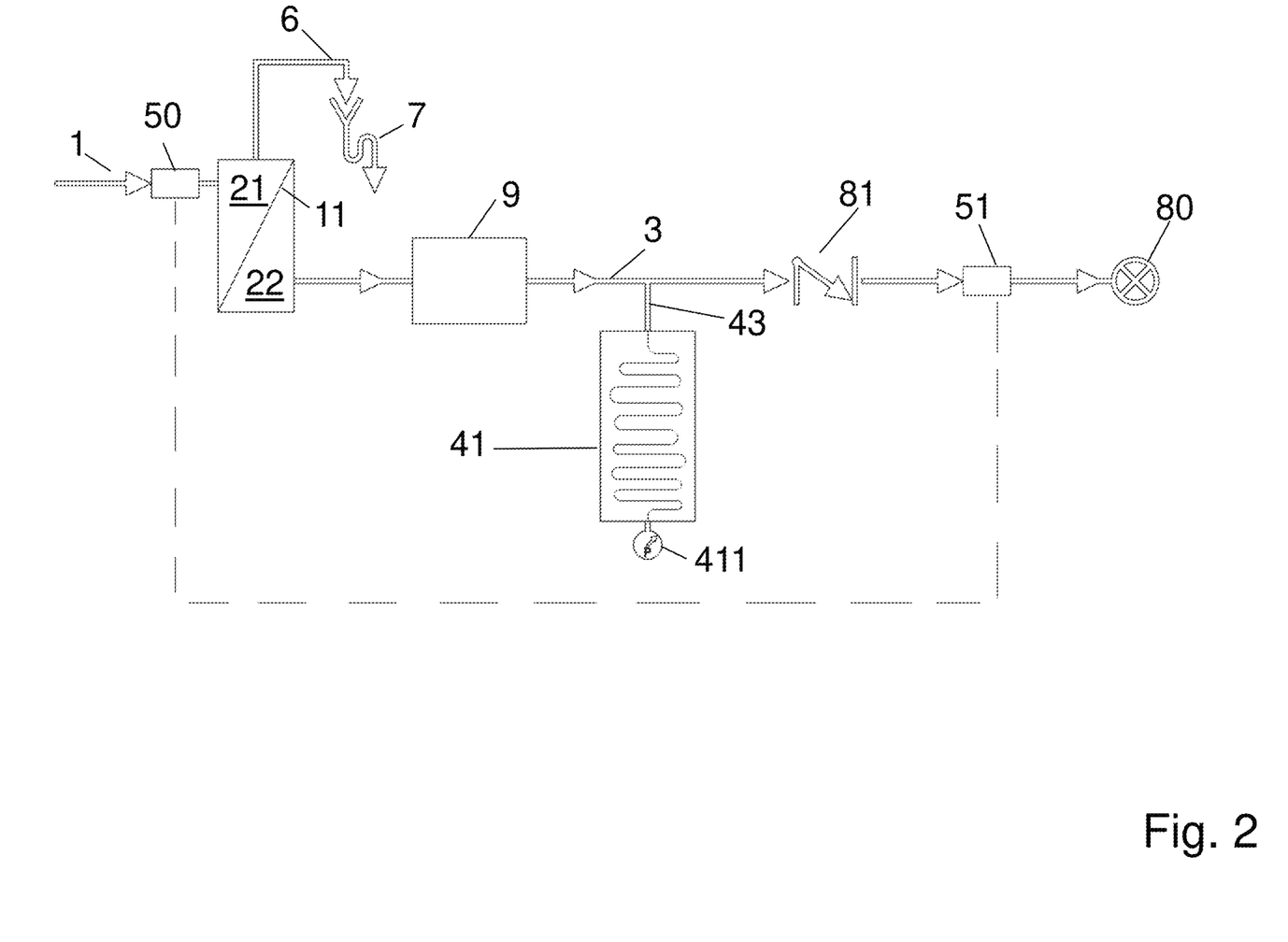
FIG. 2 is a schematic diagram of a device for purifying drinking water according to a second embodiment.
Figure 3:
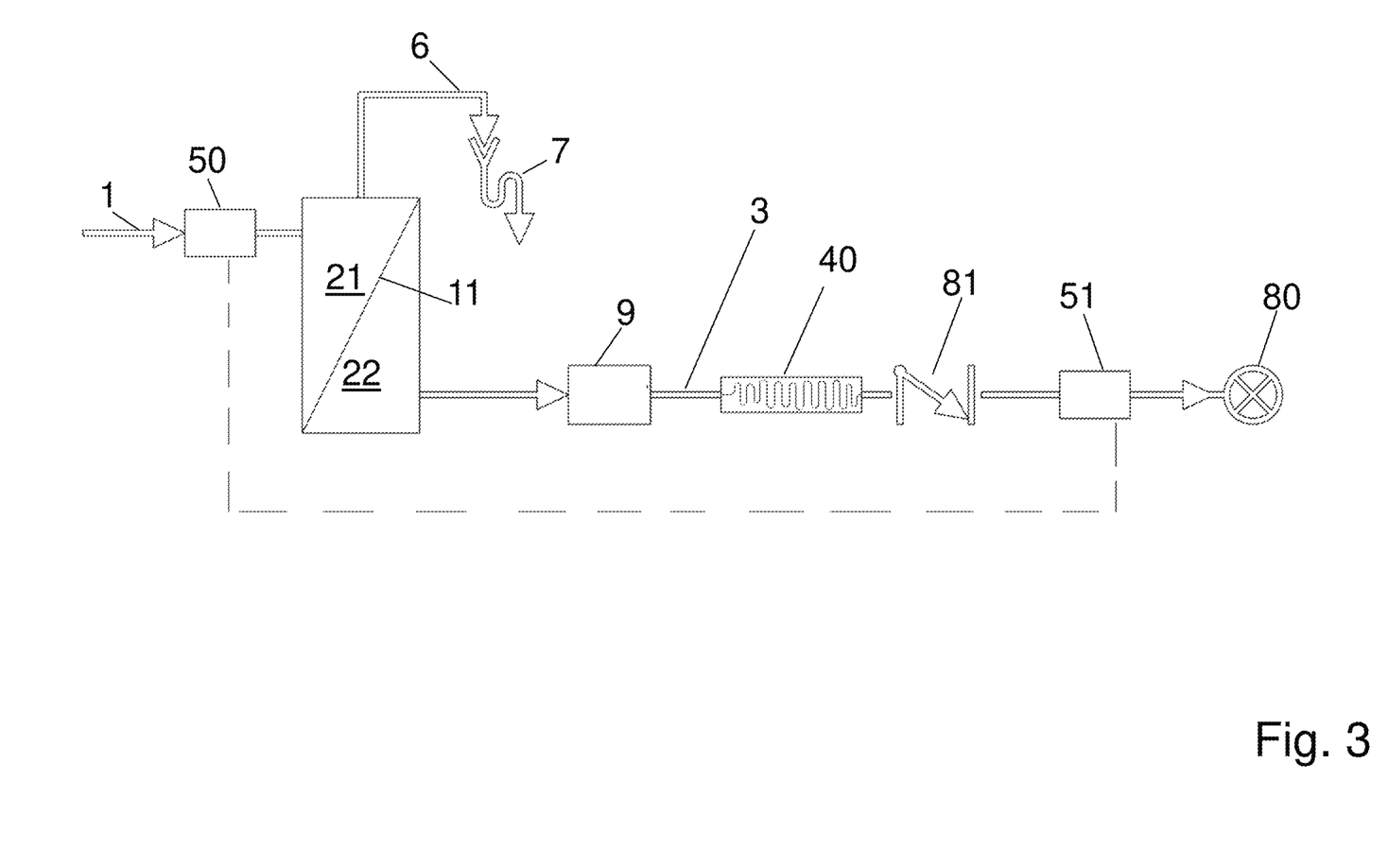
FIG. 3 is a schematic diagram of a device for purifying drinking water according to a third embodiment.
Figure 4:
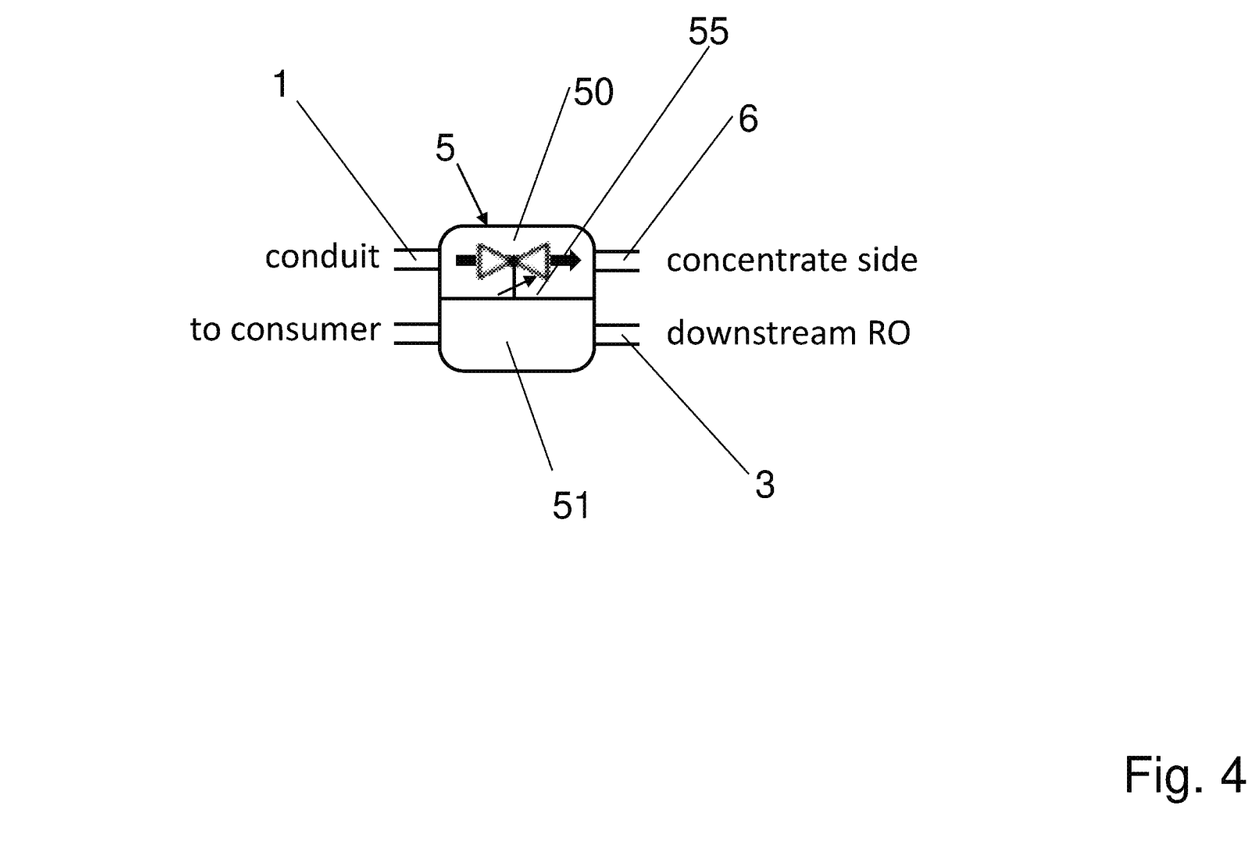
FIG. 4 is a schematic diagram of a valve that can be employed in the device of FIGS. 1 to 3 for purifying drinking water.

FIGS. 2 and 3 illustrate further embodiments, and here the shut-off valve 5 is shown in two parts to illustrate the function thereof, although in the real implementation this constitutes a single component. This is illustrated in FIG. 4.

In the context of the present application, the shut-off valve is also referred to as a stop valve.

When water is extracted, the shut-off valve 5 opens the inlet for raw water to the concentrate side of the osmosis system. When the extraction of water has been stopped, e.g. once the faucet has been closed, the shut-off valve ensures that raw water continues to flow through the concentrate side during an extraction stop phase until the permeate side has been re-pressurized, in particular until the pressure vessel has again been pressurized. It is only then that the shut-off valve closes the inflow of raw water to the concentrate side. For this purpose, the shut-off valve compares the pressure between the concentrate side and the permeate side and closes the raw water supply to the concentrate side when a design-dependent pressure differential is undershot.

For this purpose, the shut-off valve 5 may have two passages 50, 51 which are in contact via mutually corresponding diaphragms.

Shut-off valve 5 is in particular intended for use in a device for purifying drinking water which comprises a reverse osmosis container 2 and comprises a housing that defines an interior which has a water inlet connected to the feed conduit 1 and a water outlet connected to the concentrate conduit 6 and thus to the wastewater conduit 7. This fluid path represents the first passage 50 of shut-off valve 5. Furthermore, the interior of the valve 5 is connected to the permeate conduit 3 through its second passage 51.

The shut-off valve 5 may additionally have a piston, for example, that is coupled to a diaphragm plate and is configured to selectively open and close the first passage 50. In addition, at least one further diaphragm is coupled to the piston and the diaphragm plate. When the permeate pressure changes, the piston opens or closes the first passage 50 due to the deflection of the at least one diaphragm in response to the changes in permeate pressure in the second passage 51. The diaphragm plate, the piston, and the at least one further diaphragm thus form a hydraulic switching means which is designated by reference numeral 55 in the schematic diagram of FIG. 4.

The closing or opening of the first passage 50 or the second passage 51 of the shut-off valve occurs exclusively by virtue of the design of the two diaphragms in the passages of the shut-off valve.

When the consumer such as the valve 81 of water faucet 80 is closed, the first passage 50 of shut-off valve 5 will still remain open. While the pressure accumulator 4 is being filled, the pressure in the system increases until a particular pressure is reached. Thereby, the pressure differential between passages 50, 51 decreases. Once a design-dependent minimum pressure differential is reached, the valve 5 is closed by the diaphragm so that no further water will flow through the concentrate side, i.e. the first chamber of reverse osmosis 2.

According to the invention, only pure permeate is used for backflushing the membrane. No other fluid is introduced into the permeate conduit 3, in particular no gas such as compressed air or the like, for pressing the permeate counter to the extraction state flow direction from the second chamber 22 through the membrane 11 into the first chamber 21. The invention thus provides for a particularly simple and hygienic configuration of the device 10 for purifying drinking water.

FIGS. 2 and 3 illustrate further embodiments in which the function of the pressure tank is accomplished by a container made of elastic material, which is filled with purified water during the extraction state and thereby expands so that a restoring force corresponding to this expansion is created in the elastic material. During the idle operation state, this restoring force provides the pressure by which permeate is pressed out of the container made of elastic material and from the permeate conduit into the second chamber 22 and through the membrane 11.

In the embodiment shown in FIG. 2, the container made of elastic material is provided in the form of a flexible tube 41 which is connected to the permeate conduit 3 via a conduit 43. Flexible tube 41 may in particular be a silicone tube. The container 41 made of elastic material and arranged at the end on conduit 43 is equipped with a pressure monitoring valve 411 which opens when a pressure is reached in the container 41, which exceeds a threshold based on the expansion properties of the elastic material.

In the embodiment as shown in FIG. 3, this safety function is integrated in the second passage 51 of the shut-off valve. The pressure vessel is in the form of a container 40 made of elastic material, for example a silicone tube, which is flowed through during the operation state. The container 40 made of elastic material fills with purified water and the elastic material expands. In the idle operation state, with the valve 81 closed, this expansion will be undone due to the restoring force and the permeate will be pressed back from the container 40 through the permeate conduit 3 into the second chamber 22 and through the membrane 11.

The diameter, length, and wall thickness of the containers 40, 41 are dimensioned in such a manner, in particular adapted to the flow resistance of the permeate conduit and the reverse osmosis container as well as to the osmotic pressure, that in the extraction operation state a sufficiently large restoring force builds up in the elastic material to ensure backflushing of the membrane during the idle operation state.

FIG. 5 illustrates an under-counter reverse osmosis system 1000 that is operated with an additional pressure tank 400. This additional pressure tank 400 is arranged on the permeate side downstream of the under-counter reverse osmosis system 1000 and upstream of valve 81 of the water faucet as seen in the flow direction. Furthermore, FIG. 5 shows a pressure booster pump 500 upstream of the raw water 1 inlet of the under-counter reverse osmosis system 100. This pump may also be provided as an alternative to the additional pressure tank 400.

According to an advantageous embodiment it is contemplated that the entire system is encased such that the under-counter reverse osmosis system 1000, optionally together with a pressure booster pump 500 and/or an additional pressure tank 400 including a backflow preventer 450 are accommodated in a housing.

Figure 6:
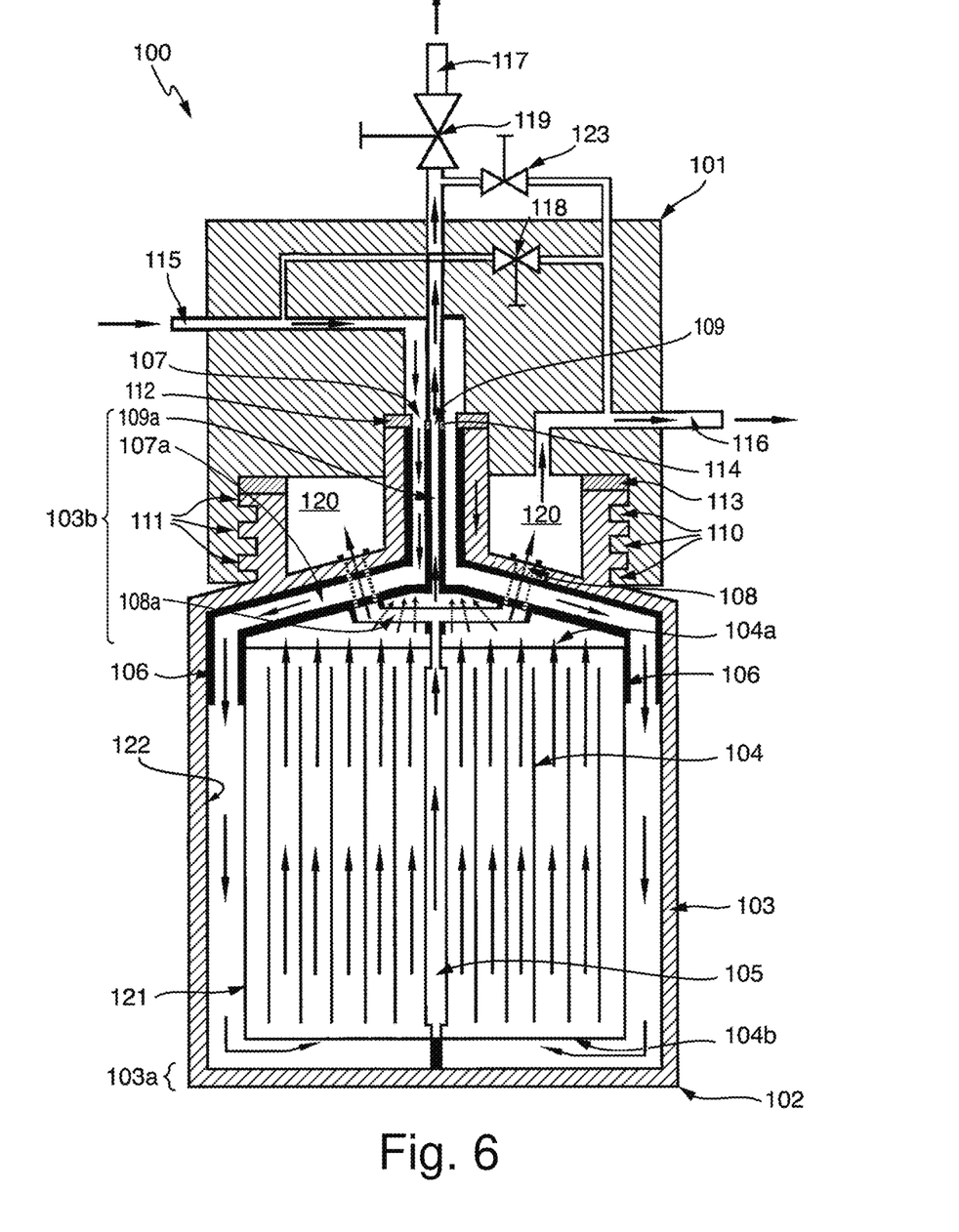
FIG. 6 is a schematic diagram of a reverse osmosis container in the form of a filter candle for a device for purifying drinking water according to a third embodiment.

FIG. 6 shows a schematic diagram of a preferred embodiment of a reverse osmosis container in the form of a filter candle 100 in a sectional view. This filter candle comprises a stationarily installed base unit 101 and a reverse osmosis device in the form of an exchangeable unit 102 which comprises a plastic housing 103 having a base 103a and an head portion 103b.

Housing 103 accommodates a reverse osmosis membrane in the form of a cylindrical coil 104 which has a first end face 104a and a second end face 104b. The permeate collecting tube 105 is located in the center of the coil. Coil 104 is coupled to the head portion 103b by adapter 106. Adapter 106 provides inlets and outlets for inflowing water and for exiting permeate and concentrate, respectively, namely inlet opening 107, outlet opening 108, and outlet opening 109. Furthermore, the adapter provides inlet passage 107a and outlet passages 108a and 109a, with passage 108a connecting the outlet opening 108 with the permeate collecting tube 105, while the concentrate is fed to the outlet opening 109 via outlet passage 109a.

The exchangeable unit 102 is coupled to the base unit 101 by screwing. For this purpose, the base unit 101 has the internal thread 110, the exchangeable unit 103 has the external thread 111. In the area of outlet openings 108 and 109, seals 112 and 114 are located between base unit 101 and exchangeable unit 102. A further seal 113 is located in the area of threads 110 and 111.

The base unit 101 has an inlet 115 for salty water to be purified in the exchangeable unit 102, an outlet 116 for permeate produced in the exchangeable unit, and an outlet 117 for concentrate produced in the exchangeable unit 102. If, as shown, the exchangeable unit 102 is screwed into the base unit 101, inlet 115 is coupled to inlet opening 107, outlet 116 is coupled to outlet opening 108, and outlet 117 is coupled to outlet opening 109.

The base unit 101 may furthermore comprise blending means 118 and/or 123 and optionally control means 119. Blending means 118 allows to admix salty water entering the base unit 101 via inlet 115 to the permeate emerging from the reverse osmosis device 102. Blending device 123 allows to admix concentrate to the permeate emerging from the reverse osmosis device 102. Control means 119 allows to control the flow rate of concentrate emerging from the reverse osmosis device 102 and thus indirectly the production of permeate in the reverse osmosis device 102.

The flow direction of the water to be purified and of the resulting permeate and concentrate within the device 100 is indicated by arrows. During operation, salty water enters the base unit 101 via inlet 115. From there, the water is fed through inlet opening 107 and into the exchangeable unit 102 of the reverse osmosis container in the form of a filter candle, where it flows through the inlet passage 107a and through a gap between the jacket 121 of the cylindrical coil 104 and the inner wall surface 122 of the pressure vessel and towards the second end face 104b and then flows axially through the coil towards the first end face 104a, whereby permeate and concentrate are produced.

While the permeate is discharged via permeate collecting tube 105, the concentrate emerges from the first end face 104a of the cylindrical coil 104. Permeate from the permeate collection tube 105 can enter the base unit 101 upwards through passage 108a and via outlet opening 108. Here it reaches an annular cavity 120 which is enclosed by the base unit 101 and the exchangeable unit 102. From there it is fed to outlet 116. The concentrate emerging from the first end face 104a of cylindrical coil 104 flows through outlet passage 109a to the outlet opening 109 which opens into base unit 101. There it is fed to the outlet 117. The amount of concentrate emerging from outlet 117 can be controlled by control means 119 which will usually be a valve.

It will be apparent to a person skilled in the art that the invention is not limited to the exemplary embodiments described above, but can rather be varied in multiple ways. The individual features of the illustrated examples may in particular be implemented in combination or may be exchanged for one another or supplemented by further features.

LIST OF REFERENCE NUMERALS

1 Input water conduit, raw water, water to be purified, feed
2 Reverse osmosis container
21 First chamber of reverse osmosis container
22 Second chamber of reverse osmosis container
100 Reverse osmosis container in the form of a filter candle
101 Stationarily installed base unit
102 Reverse osmosis device in the form of an exchangeable unit
103 Housing
103a Base of housing
103b Head portion of housing
104 Coil
104a First end face of coil
104b Second end face of coil
105 Permeate collecting tube
106 Adapter
107 Inlet opening for inflowing water
107a Inlet passage for inflowing water
108 Outlet opening for outflowing permeate
108a Outlet passage for outflowing permeate
109 Outlet opening for outflowing concentrate
109a Outlet passage for outflowing concentrate
110 Internal thread
111 External thread
112 Seal
113 Seal
114 Seal
115 Inlet for salty water to be purified
116 Outlet for produced permeate
117 Outlet for produced concentrate
118 Blending means
123 Blending means
119 Control means
121 Jacket
122 Inner wall surface
3 Permeate conduit, conduit for purified water
4 Pressure tank, pressure vessel; or reservoir with pump
40 Through flow pressure accumulator; container made of elastic material, flexible silicone tube
41 Terminal pressure accumulator; container made of elastic material, flexible silicone tube
43 Conduit between pressure tank and permeate conduit, conduit between pressure tank and outlet for purified water
5 Shut-off valve, stop valve
50 First passage
51 Second passage
55 Switching means, piston with diaphragm plate and further diaphragm
6 Concentrate conduit
7 Wastewater
8 Kitchen worktop, table
80 Faucet
81 Faucet valve
9 Absorption means, especially for disinfectants such as chlorine, e.g. activated carbon block
10 Device for purifying drinking water
11 Semipermeable membrane
1000 Under-counter reverse osmosis system
400 Additional pressure tank on permeate side
450 Check valve
500 Pump for conveying raw water in the feed conduit

The invention claimed is:

1. A method for purifying drinking water, comprising:
conveying, during an extraction operation mode, drinking water to be purified through a semipermeable membrane (11) in reverse osmosis operation and separating the drinking water into permeate and concentrate;
allowing, during an extraction stop phase, the permeate to flow into a pressure tank (4), whereby a supply of permeate accumulates and is pressurized in the pressure tank (4); and
backflushing, during an idle operation state, pressurized permeate accumulated in the pressure tank through the semipermeable membrane (11) and thereby displacing the concentrate on a concentrate side of the semipermeable membrane and removing deposits that may be present on the concentrate side of the semipermeable membrane.

2. The method for purifying drinking water as claimed in claim 1,
wherein a pressure difference across the semipermeable membrane (11) for conveying the drinking water through the semipermeable membrane (11) is in a range between 0.05 bar and 1 bar.

3. The method for purifying drinking water as claimed in claim 1,
wherein, on the concentrate side of the semipermeable membrane (11), the drinking water has a conductivity of less than 100 µS/cm in the idle operation state after the backflushing.

4. The method for purifying drinking water as claimed in claim 1,
wherein a concentration gradient across the semipermeable membrane (11) between the concentrate side and a permeate side is minimized in the idle operation state, after backflushing.

5. The method as claimed in claim 1,
wherein the semipermeable membrane is exposed to chlorine or another disinfectant only during the extraction operation mode and
wherein the semipermeable membrane is not exposed to chlorine or another disinfectant during the idle operation state.

6. The method as claimed in claim 1, wherein
only permeate is used for backflushing in the idle operation state.

* * * * *